(12) United States Patent
Zhou (10) Patent No.: US 7,706,427 B2
(45) Date of Patent: Apr. 27, 2010

(54) METHOD AND APPARATUS FOR COMPACT OVSF DESPREADING

(75) Inventor: Gongyu Zhou, North Epping (AU)

(73) Assignee: Agere Systems Inc., Allentown, PA (US)

( * ) Notice: Subject to any disclaimer, the term of this patent is extended or adjusted under 35 U.S.C. 154(b) by 1287 days.

(21) Appl. No.: 11/206,633

(22) Filed: Aug. 18, 2005

(65) Prior Publication Data

US 2007/0041433 A1 Feb. 22, 2007

(51) Int. Cl.
*H04B 1/00* (2006.01)
(52) U.S. Cl. .................. 375/140; 375/130; 375/148; 375/149; 375/150; 375/232; 375/341; 375/343
(58) Field of Classification Search .............. 375/150, 375/149, 130, 148, 232, 341, 343
See application file for complete search history.

(56) References Cited

U.S. PATENT DOCUMENTS

| | | | |
|---|---|---|---|
| 6,330,292 B1 * | 12/2001 | Dent et al. ............ 375/343 |
| 6,366,938 B1 * | 4/2002 | Levison et al. ........ 708/422 |
| 6,370,208 B1 * | 4/2002 | Kuo et al. ............. 375/343 |
| 6,646,579 B2 * | 11/2003 | Doetsch et al. ........ 341/96 |
| 7,072,384 B2 * | 7/2006 | Tanaka ................. 375/149 |
| 2007/0022230 A1 * | 1/2007 | Li et al. ................ 710/52 |

* cited by examiner

*Primary Examiner*—Shuwang Liu
*Assistant Examiner*—Dhaval Patel
(74) *Attorney, Agent, or Firm*—Mendelsohn, Drucker, & Associates, P.C.; Kevin M. Drucker; Steve Mendelsohn (57) ABSTRACT

A despreader for generating one or more despread values corresponding to application of one or more despreading codes to a sequence of spread values comprises a data buffer, an adder, a subtractor, and a controller. The adder is adapted to generate a sum of a pair of values read from the data buffer. The subtractor is adapted to generate a difference of the pair of values read from the data buffer. The controller is adapted to control (1) reading of the pair of values from the data buffer and (2) writing of the sum and difference values into the data buffer. After each pair of spread values is stored in the data buffer, the despreader generates and stores one or more pairs of sum and difference values in the data buffer.

18 Claims, 4 Drawing Sheets

FIG. 1

| OSVF CODE NUMBER | OSVF CODE |
|---|---|
| 0 | 1, 1, 1, 1, 1, 1, 1, 1, 1, 1, 1, 1, 1, 1, 1, 1 |
| 1 | 1, 1, 1, 1, 1, 1, 1, 1,-1,-1,-1,-1,-1,-1,-1,-1 |
| 2 | 1, 1, 1, 1,-1,-1,-1,-1, 1, 1, 1, 1,-1,-1,-1,-1 |
| 3 | 1, 1, 1, 1,-1,-1,-1,-1,-1,-1,-1,-1, 1, 1, 1, 1 |
| 4 | 1, 1,-1,-1, 1, 1,-1,-1, 1, 1,-1,-1, 1, 1,-1,-1 |
| 5 | 1, 1,-1,-1, 1, 1,-1,-1,-1,-1, 1, 1,-1,-1, 1, 1 |
| 6 | 1, 1,-1,-1,-1,-1, 1, 1, 1, 1,-1,-1,-1,-1, 1, 1 |
| 7 | 1, 1,-1,-1,-1,-1, 1, 1,-1,-1, 1, 1, 1, 1,-1,-1 |
| 8 | 1,-1, 1,-1, 1,-1, 1,-1, 1,-1, 1,-1, 1,-1, 1,-1 |
| 9 | 1,-1, 1,-1, 1,-1, 1,-1,-1, 1,-1, 1,-1, 1,-1, 1 |
| 10 | 1,-1, 1,-1,-1, 1,-1, 1, 1,-1, 1,-1,-1, 1,-1, 1 |
| 11 | 1,-1, 1,-1,-1, 1,-1, 1,-1, 1,-1, 1, 1,-1, 1,-1 |
| 12 | 1,-1,-1, 1, 1,-1,-1, 1, 1,-1,-1, 1, 1,-1,-1, 1 |
| 13 | 1,-1,-1, 1, 1,-1,-1, 1,-1, 1, 1,-1,-1, 1, 1,-1 |
| 14 | 1,-1,-1, 1,-1, 1, 1,-1, 1,-1,-1, 1,-1, 1, 1,-1 |
| 15 | 1,-1,-1, 1,-1, 1, 1,-1,-1, 1, 1,-1, 1,-1,-1, 1 |

FIG. 2
TABLE I

| MEMORY LOCATION \ CHIP PERIOD | 0 | 1 | 2 | 3 | 4 | 5 | 6 | 7 | | | |
|---|---|---|---|---|---|---|---|---|---|---|---|
| M0 | $x_0$ | M0+M8 | | | M0+M4 | | | | | | M0+M2 |
| M1 | | | | | | | | | | | |
| M2 | | | | | $x_4$ | M2+M10 | | | | M2+M6 | M0-M2 |
| M3 | | | | | | | | | | | |
| M4 | | | $x_2$ | M4+M12 | M0-M4 | | | | | | M4+M6 |
| M5 | | | | | | | | | | | |
| M6 | | | | | | | $x_6$ | | M6+M14 | M2-M6 | M4-M6 |
| M7 | | | | | | | | | | | |
| M8 | | $x_1$ | M0-M8 | | | M8+M12 | | | | | M8+M10 |
| M9 | | | | | | | | | | | |
| M10 | | | | | | $x_5$ | M2-M10 | | | M10+M14 | M8-M10 |
| M11 | | | | | | | | | | | |
| M12 | | | | $x_3$ | M4-M12 | M8-M12 | | | | | M12+M14 |
| M13 | | | | | | | | | | | |
| M14 | | | | | | | | $x_7$ | M6-M14 | M10-M14 | M12-M14 |
| M15 | | | | | | | | | | | |

| MEMORY LOCATION \ CHIP PERIOD | 8 | 9 | 10 | 11 | 12 | 13 | 14 | 15 | | | |
|---|---|---|---|---|---|---|---|---|---|---|---|
| M0 | | | | | | | | | | | M0+M1 |
| M1 | $x_8$ | M1+M9 | | M1+M5 | | | | | | M1+M3 | M0-M1 |
| M2 | | | | | | | | | | | M2+M3 |
| M3 | | | | | $x_{12}$ | M3+M11 | | | | M3+M7 | M1-M3 | M2-M3 |
| M4 | | | | | | | | | | | M4+M5 |
| M5 | | | $x_{10}$ | M5+M13 | M1-M5 | | | | | M5+M7 | M4-M5 |
| M6 | | | | | | | | | | | M6+M7 |
| M7 | | | | | | | $x_{14}$ | M7+M15 | M3-M7 | M5-M7 | M6-M7 |
| M8 | | | | | | | | | | | M8+M9 |
| M9 | | $x_9$ | M1-M9 | | M9+M13 | | | | | M9+M11 | M8-M9 |
| M10 | | | | | | | | | | | M10+M11 |
| M11 | | | | | $x_{13}$ | M3-M11 | | | M11+M15 | M9-M11 | M10-M11 |
| M12 | | | | | | | | | | | M12+M13 |
| M13 | | | $x_{11}$ | M5-M13 | M9-M13 | | | | | M13+M15 | M12-M13 |
| M14 | | | | | | | | | | | M14+M15 |
| M15 | | | | | | | | $x_{15}$ | M7-M15 | M11-M15 | M13-M15 | M14-M15 |

FIG. 3

FIG. 4
TABLE II

| MEMORY LOCATION \ CHIP PERIOD | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| M0 | 0 | | | | | | | | | | | | | | | 120 |
| M1 | | 1 | | | | | | | 8 | | | | | | | 28, 92 |
| M2 | | | 2 | | 4 | | | 28, 22 | | | | | | | | -64, -16 |
| M3 | | | | 6, 5 | | 9 | | -16 | | 17 | | 38 | | | | -32, -16, 54 |
| M4 | | | | | 4 | | | | | | | | 12 | 25 | | 0, -16 |
| M5 | | | | -4 | | | 6 | -8 | | | 10 | 21 | | | | -16, -8, 29 |
| M6 | | | | | | | | -4, 13 | | | | | | | | 0, -8 |
| M7 | | -1 | | -2 | | -1 | | -4 | -4 | -1 | | -4 | -4 | | 14 | 0, -4 |
| M8 | | | | | | | | | | | | | | | | 0, 0, -4, -2 |
| M9 | | | | | | 5 | | -2 | | 9 | | | | -1 | | -8, -4 |
| M10 | | | | | | | | 0 | 0 | | | | -2 | | | 0, 0 |
| M11 | | | | | | | | | | | | -1 | | 13 | | 0, 0 |
| M12 | | | | | | | | 0 | 0 | | | 0 | | | | 0, -4, -2 |
| M13 | | | | | | | | | | | | | | | | 0, 0, 0 |
| M14 | | | | -1 0 | | | | -1 0 | | | | | | | | 0, 0 |
| M15 | | | | 3 | | | | 7 | | | | 11 | | | | 15, -1, 0 |

METHOD AND APPARATUS FOR COMPACT OVSF DESPREADING

BACKGROUND OF THE INVENTION

1. Field of the Invention

The present invention relates to wireless receivers, and, in particular, to a method for despreading bit sequences that have been spread with Orthogonal Variable Spreading Factor (OVSF) codes.

2. Description of the Related Art

When a signal travels through a real-world environment, it often reaches a receiver by multiple paths. These paths occur as a result of the signal reflecting, diffracting, and scattering from various elements in the environment, e.g., mountains, trees, and buildings. Multi-path components are essentially time-delayed variants of a single signal. While, in some applications, these multiple components may result in interference, e.g., ghosting on the display of an analog-television receiver, Code Division Multiple Access (CDMA) systems intentionally make use of these multiple components.

The basic principle of CDMA systems is orthogonal coding, whereby, instead of assigning specific frequencies or time slots to each user of a system, the users are distinguished from one another by assigning codes. The codes fulfill the same role as frequency or time in frequency- or time-division systems, i.e., to keep the signals for different users from interfering with one another. In orthogonal spreading, a symbol is XOR-multiplied by a defined bit sequence called a code. If the code length is N bits, then each symbol is transformed to N so-called chips. The resulting chip rate, i.e., the number of chips per second (e.g., bits per second), is N times the original symbol rate (number of symbols per second). For example, the spreading code 1111 has a length, also called a spreading factor (SF) or Orthogonal Variable Spreading Factor (OVSF), of four. A single 1 will be spread to the sequence 0000 (1 XOR'ed with 1 gives 0), and a single 0 will be spread to the sequence 1111. In general, codes are not arbitrarily chosen, but rather, selected according to certain mathematical rules that provide sets of codes that are orthogonal to each other. Orthogonal codes have no correlation. Consequently, signals spread with codes that are orthogonal to each other do not interfere with one another. For a single connection, input data is spread with a particular code at the transmitter end. To recover the data, the same orthogonal code is used at the receiver end to despread the signal.

High-Speed Downlink Packet Access (HSDPA) is a standard for high-speed data transfer methodology employed in the Third-Generation Partnership Project (3GPP) to support the increasing use of mobile data services, including enhanced data transfer rates. In an HSDPA system, a High-Speed Physical Downlink Shared Channel (HS-PDSCH) is sent from a base station to every user in a given cell, in addition to other channels that may be available as part of the existing 3GPP standard. The HS-PDSCH channel is itself split into a variable number of (up to 15) subchannels (hereinafter, "HS-PDSCH channels" or simply "channels"), whereby users are differentiated both by scrambling codes and by time allocation of the channels in 2 ms timeslots called Transmission Time Intervals (TTI). Each user is allocated a code to access an HS-PDSCH channel during the appropriate TTI, and each user has access to an accompanying High-Speed Shared Control Channel (HS-SCCH), which carries control information used by the user's mobile device to decode the current data in the HS-PDSCH. While the actual number of HS-PDSCH channels is determined by information carried the in HS-SCCH, the present application will refer, generally, to scenarios employing all 15 HS-PDSCH channels.

Each of the 15 HS-PDSCH channels is spread using a different OVSF code with a spreading factor of 16. The receiver in a mobile device despreads all 15 channels within every 16-chip period. The despreading of an HS-PDSCH channel is essentially an accumulation process involving either addition or subtraction of received chip data based on the unique OVSF bit sequence of the channel. Received HS-PDSCH data is despread to a symbol by adding or subtracting the corresponding OVSF codes during each 16-chip period. The order of adding or subtracting for a given HD-PDSCH channel is dictated by the OVSF code corresponding to the channel's OVSF code number. To comply with the 3GPP standard, a conventional HSDPA receiver simultaneously despreads 15 HS-PDSCH channels using physical instantiations of both an independent OVSF generator and an accumulator for each channel. Each of the OVSF generators either produces the OVSF bits on-the-fly or uses a look-up table to read the OVSF bits. During each 16-chip period, the OVSF generator provides the appropriate OVSF bits to the corresponding accumulator, which despreads the chips into a symbol. For each instantiation, as many as 15 addition or subtraction operations may be performed to despread a single symbol, for a total of up to 225 (15×15) operations per symbol. Accordingly, independently despreading each HS-PDSCH channel requires much hardware and consumes much power. The same inefficiencies occur in OVSF despreading applications outside the HSDPA standard, such as performing Walsh, Hadamard, and other pattern transforms, including those used in ordinary (i.e., non-3GPP) CDMA OVSF despreading.

SUMMARY OF THE INVENTION

The present invention permits incoming chip data for up to N channels to be despread within every n-chip period using (i) a single buffer having N memory blocks to store the incoming chip data and intermediate data being despread and (ii) a common unit to perform adding and subtracting between received and buffered data, which is stored in specified locations at each chip in the buffer. At the end of each n-chip period, the despread result for all N channels can be extracted from the buffer in any order. The present invention thus provides a simple way of implementing a pattern transform correlation without actually having to generate separately a binary pattern sequence.

In one embodiment, the present invention provides a despreader for generating one or more despread values corresponding to application of one or more despreading codes to a sequence of spread values. The despreader comprises a data buffer, an adder, a subtractor, and a controller. The adder is adapted to generate a sum of a pair of values read from the data buffer. The subtractor is adapted to generate a difference of the pair of values read from the data buffer. The controller is adapted to control (1) reading of the pair of values from the data buffer and (2) writing of the sum and difference values into the data buffer. After each pair of spread values is stored in the data buffer, the despreader generates and stores one or more pairs of sum and difference values in the data buffer.

In another embodiment, the present invention provides a method for generating one or more despread values corresponding to application of one or more despreading codes to a sequence of spread values. The method comprises: (a) storing a pair of spread values in a data buffer; and (b) generating and storing one or more pairs of sum and difference values in the data buffer, wherein each pair of sum and difference values is generated by: (1) reading a pair of values from the data buffer; (2) generating a sum of the pair of values; and (3) generating a difference of the pair of values.

In a further embodiment, the present invention provides an apparatus for generating one or more despread values corresponding to application of one or more despreading codes to a sequence of spread values. The apparatus comprises: (a) means for storing a pair of spread values in a data buffer; (b) means for generating and storing one or more pairs of sum and difference values in the data buffer, wherein each pair of sum and difference values is generated by: (1) reading a pair of values from the data buffer; (2) generating a sum of the pair of values; and (3) generating a difference of the pair of values.

BRIEF DESCRIPTION OF THE FIGURES

Other aspects, features, and advantages of the present invention will become more fully apparent from the following detailed description, the appended claims, and the accompanying drawings in which like reference numerals identify similar or identical elements.

DETAILED DESCRIPTION

Figure 1:
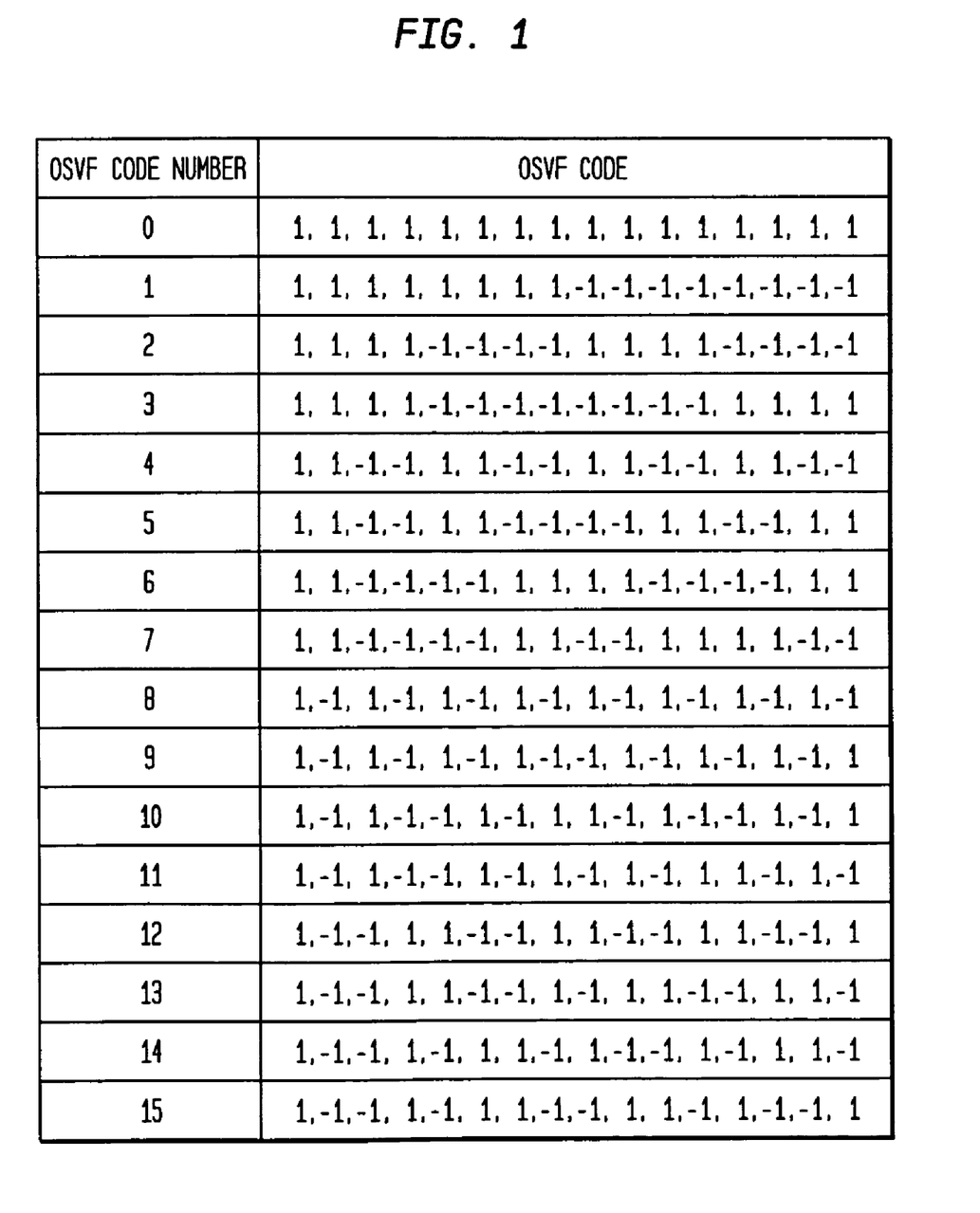
FIG. 1 is a table containing a complete set of OVSF codes for a spread factor of 16.

FIG. 1 is a table containing OVSF codes 0 through 16 for a spread factor of 16. These are the OVSF codes that will be used in an exemplary method of despreading data from all 15 HS-PDSCH channels consistent with one embodiment of the present invention. (It is noted that OVSF code 0 is not used in the HS-PDSCH channel according to the 3GPP standard, i.e., only codes 1-15 are actually used. However, to illustrate fully the principles of the invention, the calculations for all 16 channels and OVSF codes will be shown in this exemplary embodiment, and only 15 of the resulting symbols will actually be used, with the symbol corresponding to OVSF code 0 being ignored once the despreading of all 16 symbols is complete.)

The basic underlying despreading method in this embodiment works as follows: During each 4-chip period, 4 intermediate despreading results are obtained by performing a sequence of addition and the intermediate despreading results are stored in memory locations of a buffer. Pairs of the stored intermediate despreading results are added together and subtracted from each other until despreading is complete (the results of such addition and subtraction are also referred to herein as "sum and difference" values), as will now be described in further detail.

In this embodiment, there are 16 data items $x_0$ through $x_{15}$ of chip data received over a 16-chip period. The first 4 items of chip data $x_0$ through $x_3$ are processed to obtain intermediate despreading results $a_0$ through $a_3$, as follows:

$$a_0 = x_0 + x_1 + x_2 + x_3$$

$$a_1 = x_0 + x_1 - x_2 - x_3$$

$$a_2 = x_0 - x_1 + x_2 - x_3$$

$$a_3 = x_0 - x_1 - x_2 + x_3$$

The operation continues with the next 4 data items $x_4$ through $x_7$ being processed using the same sequence of addition and/or subtraction operations to arrive at intermediate despreading results $b_0$ through $b_3$, as follows:

$$b_0 = x_4 + x_5 + x_6 + x_7$$

$$b_1 = x_4 + x_5 - x_6 - x_7$$

$$b_2 = x_4 - x_5 + x_6 - x_7$$

$$b_3 = x_4 - x_5 - x_6 + x_7$$

At the end of the first 8-chip period, intermediate despreading results $c_0$ through $c_7$ are obtained by performing addition and/or subtraction on intermediate despreading results $a_0$ through $a_3$ and $b_0$ through $b_3$, to arrive at the following sum and difference values $c_0$ through $c_7$ as follows:

$$c_0 = a_0 + b_0$$

$$c_1 = a_0 - b_0$$

$$c_2 = a_1 + b_1$$

$$c_3 = a_1 - b_1$$

$$c_4 = a_2 + b_2$$

$$c_5 = a_2 - b_2$$

$$c_6 = a_3 + b_3$$

$$c_7 = a_3 - b_3$$

It is noted that, if the spread factor were 8, then the despreading process would be complete at this point, and intermediate despreading results $c_0$ through $c_7$ would be the final despreading results. However, since the spread factor in this example is 16, the same process performed to obtain intermediate spreading results $a_0$ through $a_3$ from data items $x_0$ through $x_3$ is now performed to obtain intermediate spreading results $a_4$ through $a_7$ from data items $x_8$ through $x_{11}$, as follows:

$$a_4 = x_8 + x_9 + x_{10} + x_{11}$$

$$a_5 = x_8 + x_9 - x_{10} - x_{11}$$

$$a_6 = x_8 - x_9 + x_{10} - x_{11}$$

$$a_7 = x_8 - x_9 - x_{10} + x_{11}$$

The next 4 data items $x_{12}$ through $x_{15}$ are then processed using the same sequence of addition and/or subtraction operations to arrive at intermediate despreading results $b_4$ through $b_7$, as follows:

$$b_4 = x_{12} + x_{13} + x_{14} + x_{15}$$

$$b_5 = x_{12} + x_{13} - x_{14} - x_{15}$$

$$b_6 = x_{12} - x_{13} + x_{14} - x_{15}$$

$$b_7 = x_{12} - x_{13} - x_{14} + x_{15}$$

At the end of the second 8-chip period, intermediate despreading results $c_8$ through $c_{15}$ are obtained by performing addition and/or subtraction on intermediate despreading results $a_4$ through $a_7$ and $b_4$ through $b_7$, to arrive at the following sum and difference values $c_8$ through $c_{15}$:

$$c_8=a_4+b_4$$
$$c_9=a_4-b_4$$
$$c_{10}=a_5+b_5$$
$$c_{11}=a_5-b_5$$
$$c_{12}=a_6+b_6$$
$$c_{13}=a_6-b_6$$
$$c_{14}=a_7+b_7$$
$$c_{15}=a_7-b_7$$

The final despreading results $d_0$ through $d_{16}$ are now obtained by performing addition and/or subtraction on intermediate despreading results $c_0$ through $c_{15}$, to arrive at the following sum and difference values $d_0$ through $d_{15}$ as follows:

$$d_0=c_0+c_8$$
$$d_1=c_0-c_8$$
$$d_2=c_1+c_9$$
$$d_3=c_1-c_9$$
$$d_4=c_2+c_{10}$$
$$d_5=c_2-c_{10}$$
$$d_6=c_3+c_{11}$$
$$d_7=c_3-c_{11}$$
$$d_8=c_4+c_{12}$$
$$d_9=c_4-c_{12}$$
$$d_{10}=c_5+c_{13}$$
$$d_{11}=c_5-c_{13}$$
$$d_{12}=c_6+c_{14}$$
$$d_{13}=c_6-c_{14}$$
$$d_{14}=c_7+c_{15}$$
$$d_{15}=c_7-c_{15}$$

Figure 2:
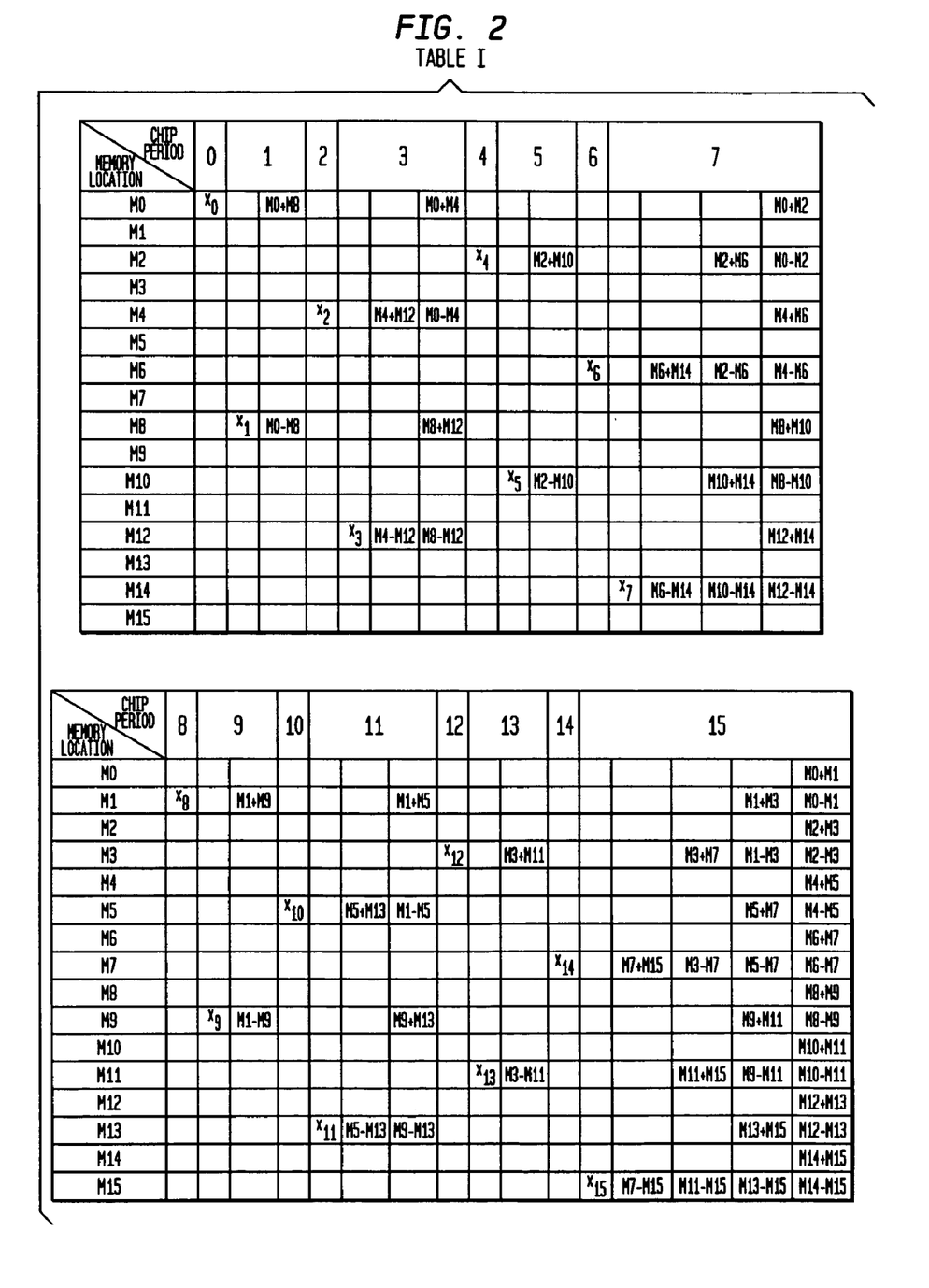
FIG. 2 is a table illustrating a compact representation of a despreading process consistent with the present invention.

With reference now to FIG. 2, Table I illustrates a compact representation of the foregoing process for obtaining despreading results $d_0$ through $d_{15}$ by storing and accumulating all of the foregoing values in a single buffer having 16 memory locations. The buffer will store some received chip data and some intermediate despreading results during a 16-chip period. At the end of the 16-chip period, the buffer will contain 15 completely-despread HS-PDSCH symbols (along with the one ignored symbol for OVSF code 0), with the relative positions of the symbols in the buffer in an order that corresponds to the OVSF code numbers for the HS-PDSCH channels. In Table I, rows 0-15 correspond to the 16 memory locations M0 through M15 in the buffer, and columns 0-15 correspond to the 16 chip periods. The values $x_0$ through $x_{15}$ in the body of the table refer to the 16 data items received over the 16-chip period, and the values M0 through M15, as used in the addition/subtraction expressions, refer to the values stored in the corresponding memory locations in the buffer at the beginning of the chip period under which the memory locations appear. It should be noted that the address pattern for storing the received data and/or intermediate calculation results during each chip period of Table I are merely exemplary and, in other embodiments, may be different from those illustrated in Table I. The despreading operation proceeds as follows:

During chip period 0: Chip 0 data is received and stored in memory location M0.

During chip period 1: Chip 1 data is received and stored in memory location M8. The chip 1 data stored in memory location M8 is added to the chip 0 data stored in memory location M0, and the resulting sum is stored in memory location M0. At the same time, the chip 1 data stored in memory location M8 is subtracted from the chip 0 data stored in memory location M0, and the resulting difference is stored in memory location M8.

During chip period 2: Chip 2 data is received and stored in memory location M4.

During chip period 3: Chip 3 data is received and stored in memory location M12. The chip 3 data stored in memory location M12 is added to the chip 2 data stored in memory location M4, and the resulting sum is stored in memory location M4. At the same time, the chip 3 data stored in memory location M12 is subtracted from the chip 2 data stored in memory location M4, and the resulting difference is stored in memory location M12. Next, the following four operations take place, wherein steps (1) and (2) occur simultaneously, and steps (3) and (4) occur simultaneously: (1) the value stored in memory location M4 is added to the value stored in memory location M0, and the resulting sum is stored in memory location M0; (2) the value stored in memory location M4 is subtracted from the value stored in memory location M0, and the resulting difference is stored in memory location M4; (3) the value stored in memory location M12 is added to the value stored in memory location M8, and the resulting sum is stored in memory location M8; and (4) the value stored in memory location M12 is subtracted from the value stored in memory location M8, and the resulting difference is stored in memory location M12.

During chip period 4: Chip 4 data is received and stored in memory location M2.

During chip periods 5 through 15: The process continues as shown in Table I, until 16 symbols are generated as the final despreading results during the last step of chip period 15.

It should be noted that the memory locations specified in the foregoing example are merely exemplary, and that memory locations other than those set forth above may be used. For example, during chip period 1, while memory location M8 is described as being used to store chip 1 data temporarily, another unused memory location could alternatively be used. It should also be recognized that some or all of the foregoing calculations may take place at different times or simultaneously, depending, e.g., on hardware configuration.

As described above and shown in Table I, during some of the chip periods (e.g., 3, 7, 11, and 15), multiple successive sets of calculations take place, each dependent on the results from the previous set. Accordingly, the timing and order of these calculations should be consistent with the timing and order of the calculations shown in Table I.

Figure 3:
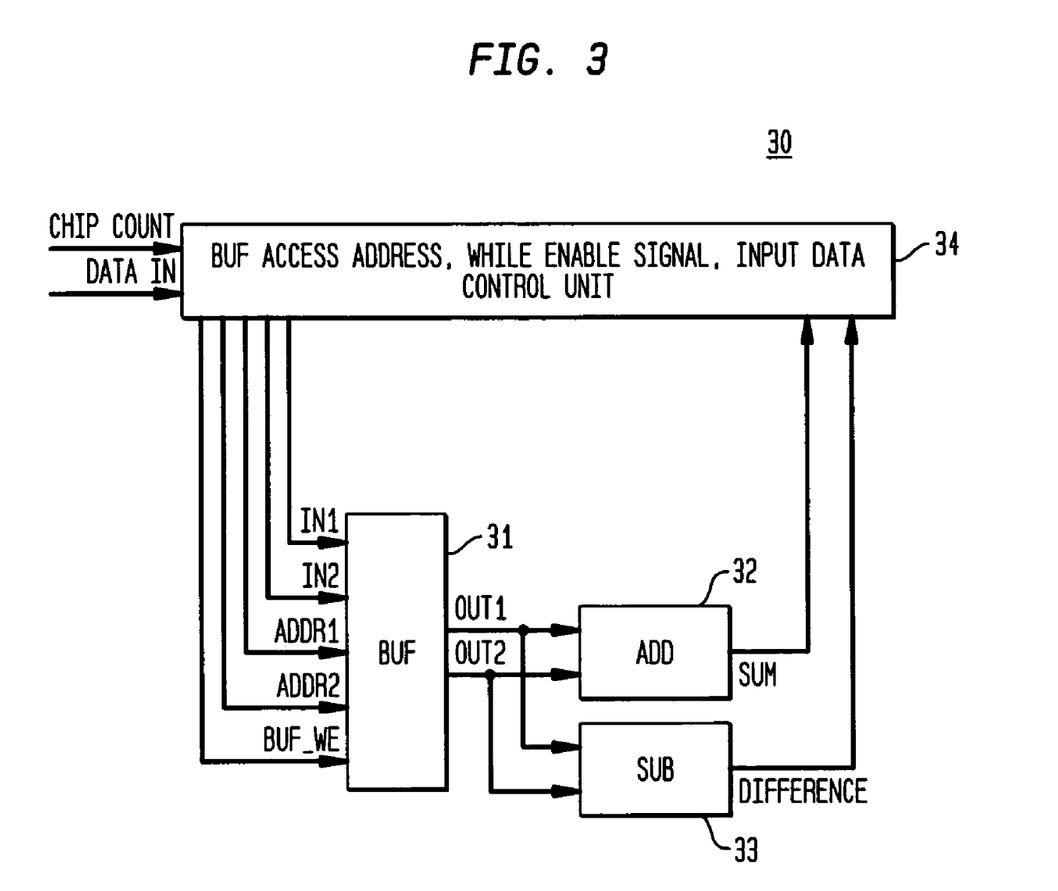
FIG. 3 is a block diagram of an exemplary despreader in one embodiment of the present invention that implements the process steps shown in FIG. 2.

FIG. 3 shows an exemplary despreader 30 in one embodiment of the invention that implements the process steps shown in Table I. As shown, despreader 30 comprises a buffer 31, an adder 32, a subtractor 33, and a controller 34. Buffer 31, which stores received chip data and intermediate despreading results, has a size of 16×b, where b is a bit width larger than a bit width corresponding to the precision of the input data to be despread. For example, if the input data has a length of 8 bits, then b might be 12, to take into account the size of accumulated intermediate despreading results (i.e., partially-despread chip data) in the buffer. Buffer 31 is at least a two-port memory addressable via addresses addr1 and addr2. (While buffer 31 is shown as being a four-port memory in FIG. 3, i.e., receiving two data values in1, in2 and providing two data values out1, out2, the same two ports could be used to write in1, in2 during certain steps and to read out1, out2 during other steps, since no simultaneous read and write operations are necessary, and thus, a two-port memory would suffice.) Buffer 31 is in write mode when the buf_we write enable signal is asserted and in read mode when the buf_we signal is deasserted. Buffer 31 receives input data values in1 and in2 and provides output data values out1 and out2. Adder 32 is used to read values stored in two memory locations of buffer 31 and provide the sum of the values to controller 34. Subtractor 33 is used to read the same two values from buffer 31 and provide the difference of the values to controller 34. Controller 34 is adapted to receive from an external source (1) input data to be despread and (2) a corresponding chip count. Controller 34 is adapted to provide to buffer 31 input data values in1, in2, each data value to be stored in a corresponding memory location of buffer 31. Controller 34 is further adapted to generate and provide to buffer 31 write enable signal buf_we. Controller 34 also includes a state machine to generate a set of pre-arranged addresses for addressing the various memory locations in buffer 31 by providing addresses addr1, addr2 to specify both (i) the memory locations to which data values in1, in2 are to be written, and (ii) the memory locations from which data values out1, out2 are to be read.

Figure 4:
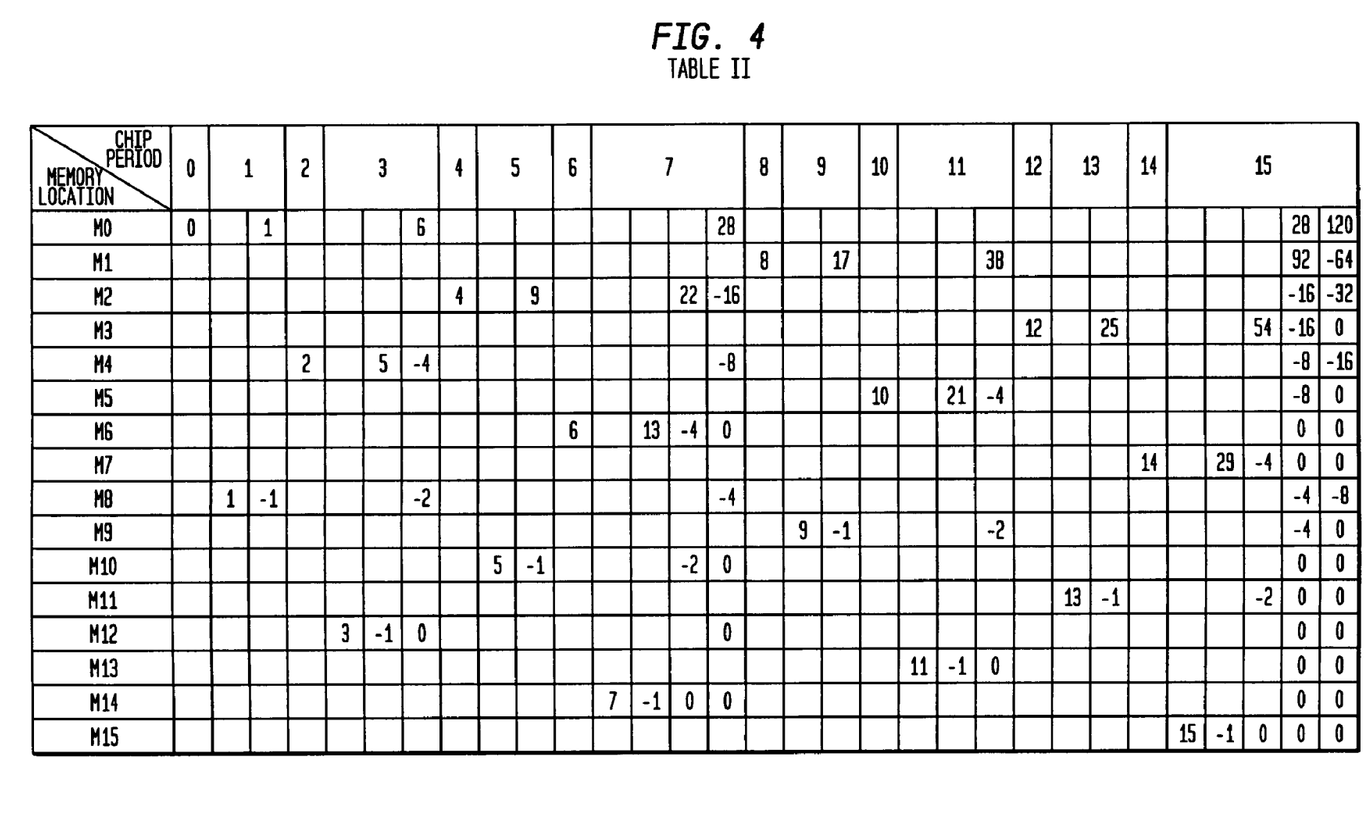
FIG. 4 is a table illustrating exemplary buffer contents at all stages of the 16-chip period despreading process shown in FIG. 2, including chip data received, the corresponding intermediate despreading results, and the final despreading results.

Turning now to FIG. 4, Table II illustrates exemplary contents of buffer 31 at all stages of the 16-chip period despreading process, including chip data received, the corresponding intermediate despreading results, and the final despreading results. In this example, the received data consists of the following sequence of integers: 0, 1, 2, 3, 4, . . . , 15. The despreading operation proceeds as follows:

During chip period 0: Controller 34 receives the value 0 as chip 0 data, generates the value 0 as addr1, asserts the buf_we signal to place buffer 31 in write mode, and provides the value 0 as input in1 to buffer 31 for storage in memory location M0.

During chip period 1: Controller 34 receives the value 1 as chip 1 data, generates the value 8 as addr1, asserts the buf_we signal to place buffer 31 in write mode, and provides the value 1 as input in1 to buffer 31 for storage in memory location M8. Next, controller 34 generates the value 0 as addr1 and the value 8 as addr2 and deasserts the buf_we signal to place buffer 31 in read mode, causing both adder 32 and subtractor 33 to read out (i) the value 0 stored in memory location M0 as out1 and (ii) the value 1 stored in memory location M8 as out2. Controller 34 receives the results of the addition and subtraction operations (i.e., 1 and −1). Controller 34 generates the value 0 as addr1 and the value 8 as addr2, asserts the buf_we signal to place buffer 31 in write mode, provides as input in1 for storage in memory location M0 the result of the addition operation, i.e., the value of 1, and provides as input in2 for storage in memory location M8 the result of the subtraction operation, i.e., the value of −1.

During chip period 2: Controller 34 receives the value 2 as chip 2 data, generates the value 4 as addr1, asserts the buf_we signal to place buffer 31 in write mode, and provides the value 2 as input in1 to buffer 31 for storage in memory location M4.

During chip period 3: Controller 34 receives the value 3 as chip 3 data, generates the value 12 as addr1, asserts the buf_we signal to place buffer 31 in write mode, and provides the value 3 as input in1 to buffer 31 for storage in memory location M12. Next, controller 34 generates the value 4 as addr1 and the value 12 as addr2 and deasserts the buf_we signal to place buffer 31 in read mode, causing both adder 32 and subtractor 33 to read out (i) the value 2 stored in memory location M4 as out1 and (ii) the value 3 stored in memory location M12 as out2. Controller 34 then receives the results of the addition and subtraction operations (i.e., 5 and −1). Controller 34 generates the value 4 as addr1 and the value 12 as addr2, asserts the buf_we signal to place buffer 31 in write mode, provides as input in1 for storage in memory location M4 the result of the addition operation, i.e., the value 5, and provides as input in2 for storage in memory location M12 the result of the subtraction operation, i.e., the value of −1. Next, controller 34 generates the value 0 as addr1 and the value 4 as addr2 and deasserts the buf_we signal to place buffer 31 in read mode, causing both adder 32 and subtractor 33 to read out (i) the value 5 stored in memory location M4 as out1 and (ii) the value 1 stored in memory location M0 as out2. Controller 34 generates the value 0 as addr1 and the value 4 as addr2, asserts the buf_we signal to place buffer 31 in write mode, provides as input in1 for storage in memory location M0 the result of the addition operation, i.e., the value 6, and provides as input in2 for storage in memory location M4 the result of the subtraction operation, i.e., the value −4. Next, controller 34 generates the value 8 as addr1 and the value 12 as addr2 and deasserts the buf_we signal to place buffer 31 in read mode, causing both adder 32 and subtractor 33 to read out (i) the value −1 stored in memory location M8 as out1 and (ii) the value −1 stored in memory location M12 as out2. Controller 34 generates the value 8 as addr1 and the value 12 as addr2, asserts the buf_we signal to place buffer 31 in write mode, provides as input in1 for storage in memory location M8 the result of the addition operation, i.e., the value −2, and provides as input in2 for storage in memory location M12 the result of the subtraction operation, i.e., the value 0.

During chip period 4: Controller 34 receives the value 4 as chip 4 data, generates the value 4 as addr1, asserts the buf_we signal, and provides the value 2 as input in1 to buffer 31 for storage in memory location M2.

During chip periods 5 through 15: The process continues as shown in Table II, until the buffer contains the following set of 16 symbols, which are generated as the final despreading results during the last step of chip period 15: 120, −64, −32, 0, −16, 0, 0, 0, −8, 0, 0, 0, 0, 0, 0, 0. The buffer thus contains 15 completely-despread HS-PDSCH symbols (along with the one ignored symbol for OVSF code 0), with the relative positions of the symbols in the buffer in an order that corresponds to the OVSF code numbers for the HS-PDSCH channels, i.e., the despread symbol corresponding to OVSF code 1 is 120, the despread symbol corresponding to OVSF code 2 is −64, and so forth. As an alternative to reading out the despread symbols in sequence based on OVSF code numbers, it should be understood that the despread symbols can be read out in any order necessary.

The foregoing hardware configuration advantageously uses a single computation unit for performing the entire despreading operation and requires only N memory locations to store all of the received data, intermediate despreading results, and final despreading results, where N is equal to the number of channels from which data is received.

It should be recognized that the foregoing process steps may be implemented using many different hardware and/or software devices, and that the hardware despreader illustrated in FIG. 3 is merely exemplary. It should further be recognized that the invention may be used with despreading applications outside the HSDPA standard, including applications that involve performing Walsh, Hadamard, and other pattern transforms and correlations, such as those employed in ordinary (i.e., non-3GPP) WCDMA OVSF despreading. The teachings of the present invention may also be scaled for use with spread factors other than 16 that are non-zero multiples of 4, as well as for other spread factors, e.g., non-multiples of 4, or spread factors greater than 512.

It should also be recognized that the present invention may be implemented in code generation for despreading in contexts other than OVSF, as well as for descrambling, and that code sequences other than those described herein, consistent with various embodiments of the present invention, are possible.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

While the embodiments described herein refer to a single data buffer, it should be understood that multiple data buffers could be used in other embodiments of the invention, and that the invention should not be construed as being limited to a single data buffer.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A despreader for generating one or more despread values corresponding to application of one or more despreading codes to a sequence of spread values, the despreader comprising:

one or more data buffers;

an adder adapted to generate a sum of a pair of values read from the one or more data buffers;

a subtractor adapted to generate a difference of the pair of values read from the one or more data buffers; and a controller adapted to control (1) reading of the pair of values from the one or more data buffers and (2) writing of the sum and difference values into the one or more data buffers, wherein:

after each pair of spread values is stored in the one or more data buffers, the despreader generates and stores one or more pairs of sum and difference values in the one or more data buffers;

the despreader is adapted to store one or more of the pairs of sum and difference values in the one or more data buffers as intermediate despread values; and the despreader is adapted to generate each pair of sum and difference values from either (i) a pair of spread values or (ii) a pair of previously generated intermediate despread values.

2. The invention of claim 1, comprising a single adder and a single subtractor.

3. The invention of claim 1, wherein the one or more data buffers consists of a single data buffer having a size equal to a number of spread values in the sequence.

4. The invention of claim 3, wherein the despreader is adapted to store sum and difference values in the one or more data buffers as intermediate despread values.

5. The invention of claim 3, wherein the despreader is adapted to overwrite previously stored values in the one or more data buffers with intermediate despread values.

6. The invention of claim 1, wherein, after a last pair of spread values in the sequence is stored in the one or more data buffers, the despreader generates and stores one or more of the pairs of sum and difference values that are despread values.

7. The invention of claim 1, wherein the despreader is adapted to generate despread values as the sum and difference of one or more of the pairs of previously generated intermediate despread values.

8. The invention of claim 1, wherein the despreading codes are OVSF codes.

9. A despreader-implemented method for generating one or more despread values corresponding to application of one or more despreading codes to a sequence of spread values, the method comprising:

(a) the despreader storing a pair of spread values in one or more data buffers; and (b) the despreader generating and storing one or more pairs of sum and difference values in the one or more data buffers, wherein:

each pair of sum and difference values is generated by:

(1) reading a pair of values from the one or more data buffers;

(2) generating a sum of the pair of values; and (3) generating a difference of the pair of values;

one or more of the pairs of sum and difference values are stored in the one or more data buffers as intermediate despread values; and each pair of sum and difference values is generated from either (i) a pair of spread values or (ii) a pair of previously generated intermediate despread values.

10. The invention of claim 9, comprising generating, for each pair of spread values in the sequence, a first pair of sum and difference values as the sum and difference of the spread values.

11. The invention of claim 9, wherein the one or more data buffers consists of a single data buffer having a size equal to a number of spread values in the sequence.

12. The invention of claim 9, comprising storing each pair of sum and difference values in the one or more data buffers as a pair of intermediate despread values.

13. The invention of claim 12, comprising overwriting a pair of previously stored values in the one or more data buffers with the pair of intermediate despread values.

14. The invention of claim 13, wherein the pair of intermediate despread values overwrite the pair of previously stored values used to generate the pair of intermediate despread values.

15. The invention of claim 9, comprising, after a last pair of spread values in the sequence is stored in the one or more data buffers, generating and storing one or more of the pairs of sum and difference values that are despread values.

16. The invention of claim 9, wherein despread values are generated as the sum and difference of one or more of the pairs of previously generated intermediate despread values.

17. The invention of claim 9, further comprising selecting, as a final despread value, a value from among the pairs of sum and difference values.

18. An apparatus for generating one or more despread values corresponding to application of one or more despreading codes to a sequence of spread values, the apparatus comprising:
  (a) means for storing a pair of spread values in one or more data buffers; and
  (b) means for generating and storing one or more pairs of sum and difference values in the one or more data buffers, wherein:
  each pair of sum and difference values is generated by:
  (1) reading a pair of values from the one or more data buffers;
  (2) generating a sum of the pair of values; and
  (3) generating a difference of the pair of values;
  one or more of thr pairs of sum and difference values are stored in the one or more data buffers as intermediate despread values; and
  each pair of sum and difference values is generated from either (i) a pair of spread values or (ii) a pair of previously generated intermediate despread values.

\* \* \* \* \*